US008881925B1

(12) United States Patent  (10) Patent No.: US 8,881,925 B1
Toscano et al.  (45) Date of Patent: *Nov. 11, 2014

(54) PROTECTIVE STEEL MEMBRANE SYSTEM AND METHOD OF ERECTION FOR SECONDARY CONTAINMENT FOR AN ABOVE GROUND STORAGE TANK

(75) Inventors: John R. Toscano, Pompano Beach, FL (US); Michael Crabb, Delray Beach, FL (US)

(73) Assignee: John R. Toscano, Inc., Fort Lauderdale, FL (US)

( * ) Notice: Subject to any disclaimer, the term of this patent is extended or adjusted under 35 U.S.C. 154(b) by 757 days.

This patent is subject to a terminal disclaimer.

(21) Appl. No.: 13/113,621

(22) Filed: May 23, 2011

Related U.S. Application Data

(62) Division of application No. 12/100,191, filed on Apr. 9, 2008, now Pat. No. 7,946,439.

(60) Provisional application No. 60/922,529, filed on Apr. 9, 2007.

(51) Int. Cl.
   *B65D 90/04* (2006.01)
   *G01M 3/02* (2006.01)
(52) U.S. Cl.
   USPC .......................................... 220/62.17; 73/49.2
(58) Field of Classification Search
   CPC ............................ B65D 90/501; B65D 90/028
   USPC .................. 73/40, 40.7, 49.2, 49.3; 220/23.9, 220/62.11, 62.18, 2.17, 627
   See application file for complete search history.

(56) References Cited

U.S. PATENT DOCUMENTS

| 1,259,320 | A | * | 3/1918 | Tyler | 105/423 |
| 1,927,255 | A | | 9/1933 | Brown | |
| 2,220,186 | A | | 11/1940 | Walker | |

(Continued)

FOREIGN PATENT DOCUMENTS

| GB | 1039654 | 8/1966 |
| WO | 01/68510 | 9/2001 |

OTHER PUBLICATIONS

Nickel Development Institute; Wallpapering steel lining with nickel-chromium-molybdenum alloys guidelies; Ref. Book Series No. 11 020; Feb. 2000.

(Continued)

*Primary Examiner* — John Fitzgerald
(74) *Attorney, Agent, or Firm* — Keller Life Science Law, P.A.; Michael J. Keller

(57) ABSTRACT

An efficient, cost-saving system and method of designing, installing, testing, and monitoring a secondary containment system for new and existing Above Ground Storage Tanks (ASTs) that is comprised of a protective steel membrane for the floor of the tank, including the floor-to-wall juncture, and the lower portion of the tank shell such that the steel membrane creates one or more interstitial zones between the steel membrane and the tank shell. The steel membrane may be installed zone by zone such that the secondary containment system can encapsulate existing tank features by molding itself around the existing contours, such as repair plates, corners, sumps, etc. Furthermore, a unique testing method using a simple electronic device is provided for on-site testing of the integrity of the weld seams that may be efficiently used after each zone is installed without requiring that the entire tank be evacuated during the construction of other zones.

20 Claims, 13 Drawing Sheets

(56) References Cited

U.S. PATENT DOCUMENTS

| | | | |
|---|---|---|---|
| 2,460,054 A | | 1/1949 | Wiggins |
| 3,902,356 A | | 9/1975 | Rupf-Bolz |
| 4,041,722 A | | 8/1977 | Terlesky et al. |
| 4,413,503 A | | 11/1983 | Olivieri |
| 4,453,875 A | | 6/1984 | Johnson |
| 4,739,895 A | | 4/1988 | Bachmann et al. |
| 4,796,676 A | | 1/1989 | Hendershot et al. |
| 4,871,084 A | | 10/1989 | Robbins |
| 4,916,939 A | | 4/1990 | Mogel |
| 4,939,833 A | | 7/1990 | Thomas |
| RE33,421 E | * | 11/1990 | Bachmann ............ 220/4.12 |
| 5,008,294 A | | 4/1991 | Neiss et al. |
| 5,096,087 A | | 3/1992 | Thomas |
| 5,117,677 A | | 6/1992 | Hendershot et al. |
| 5,154,312 A | | 10/1992 | Robbins |
| 5,167,352 A | | 12/1992 | Robbins |
| 5,248,220 A | * | 9/1993 | Rohringer ............ 405/53 |
| 5,259,895 A | | 11/1993 | Sharp |
| 5,265,465 A | | 11/1993 | Thomas |
| 5,269,172 A | | 12/1993 | Daigle et al. |
| 5,269,436 A | | 12/1993 | Bachmann |
| 5,271,493 A | | 12/1993 | Hall |
| 5,303,840 A | | 4/1994 | Sharp |
| 5,312,162 A | | 5/1994 | Baebel |
| 5,423,457 A | | 6/1995 | Nicholas et al. |
| 5,450,975 A | | 9/1995 | Lawrence |
| 5,494,183 A | | 2/1996 | Sharp |
| 5,505,329 A | | 4/1996 | Kauffman |
| 5,597,948 A | | 1/1997 | Sharp |
| 5,664,313 A | | 9/1997 | Palazzo |
| 5,809,650 A | | 9/1998 | Reese et al. |
| 5,829,625 A | * | 11/1998 | Imagawa ............ 220/567.1 |
| 5,833,390 A | | 11/1998 | Lovett |
| 6,113,820 A | | 9/2000 | Lyzinski et al. |
| 6,206,226 B1 | | 3/2001 | Coates et al. |
| 6,339,951 B1 | | 1/2002 | Kashmiri et al. |
| 6,398,057 B1 | * | 6/2002 | Berg et al. ............ 220/62.19 |
| 6,431,387 B2 | | 8/2002 | Piehler et al. |
| 6,836,732 B2 | | 12/2004 | Tiberi |
| 6,886,388 B1 | | 5/2005 | McGill et al. |
| 7,051,579 B2 | | 5/2006 | Kenney et al. |
| 7,290,676 B1 | | 11/2007 | Brown |
| 7,494,024 B2 | | 2/2009 | Brown |
| 2002/0084276 A1 | * | 7/2002 | Berg et al. ............ 220/560.03 |
| 2004/0069779 A1 | * | 4/2004 | Schmidt et al. ............ 220/4.12 |
| 2004/0234338 A1 | | 11/2004 | Monroe et al. |
| 2006/0086741 A1 | | 4/2006 | Bacon et al. |
| 2007/0177327 A1 | | 8/2007 | Brown |

OTHER PUBLICATIONS

Richard E. Avery, Jonathan D. Harrington, William L. Mathay; Stainless steel sheet lining of steel tanks and pressure vessels; NiDI Tec. Series No. 10 039, Oct. 1991.

N. Matsuhisa, T. Matsuhisa, H. Nagano; Use of Stainless Steels and Hybrid Steels in Reservoir Tanks; Morimatsu Industries Co., Ltd., Japan; pp. 421-425, 2003.

Richard E. Avery; Sheet lining fabrication; The British Library, 1994.

American Petroleum Institute; Tank inspection, Repair, Alteration, and Reconstruction, API Standard 653, Third Ed., Dec. 2001.

National Institute for Storage Tank Management; Seventh Annual International Conf. on Aboveground Storage Tanks; May 2004.

Philip E. Meyers; Aboveground Storage Tanks; McGraw-Hill, 1997.

American Petroleum Institute; Welded Steel Tanks for Oil Storage, API Standard 650, Tenth Ed., Nov. 1998; Addendum 1, Jan. 2000; Anddendum 2, Nov. 2001; Addendum 3, Sep. 2003.

John R. Tascano, P.E.; Seventh Annual AST Conference (lecture), Mar. 2008.

Enviro*Steel; Interstitial Space Monitoring (ISM) system; 240105A (Rev#3-04/05); ISM Manual/Overview, Aug. 2005.

Enviro*Steel; We're good for your bottom line: The Enviro-Steel Double Bottom System (DBS) is a patent-pending process for the installation of sub-grade protection and under-tank leak detection for above-ground storage tanks (AST), Aug. 2005.

* cited by examiner

PROTECTIVE STEEL MEMBRANE SYSTEM AND METHOD OF ERECTION FOR SECONDARY CONTAINMENT FOR AN ABOVE GROUND STORAGE TANK

PRIORITY CLAIM

This application is a continuation of U.S. patent application Ser. No. 12/100,191, filed on Apr. 9, 2008, now U.S. Pat. No. 7,946,639 which claims priority to U.S. Provisional Application No. 60/922,529, filed on Apr. 9, 2007, the disclosure and contents of which are expressly incorporated herein by reference.

FIELD OF INVENTION

The present invention relates to a means of designing, installing, testing and monitoring a secondary containment system for new and existing Above Ground Storage Tanks (ASTs) or any other type of fluid containment structure.

BACKGROUND OF THE INVENTION

Recently enacted environmental and energy regulations are requiring that all storage units that contain hazardous and volatile materials, such as Above Ground Storage Tanks and pipelines, be secondarily contained in order to eliminate the occurrence of leakages into the surrounding environment as the integrity of many of the existing tanks and pipelines have degraded over time due to corrosion or were poorly constructed in the first instance. Therefore, several systems have been developed for creating an impervious secondary containment unit in order that the product does not seep or leak out of the primary storage unit into the surrounding environment. In addition, a number of these regulations also require that leak detection and monitoring systems be employed for maintaining the integrity of the secondary containment units. For example, several systems create a control space, such as an interstice, between the primary and secondary units in which, using a liquid or a pressurized gas, one can detect the presence of leaks within the control space by observing the level of liquid or gas within the control space using one or more sensors, a graduated tube or a pressure-drop switch that is in fluid communication with the control space.

However, many of these systems do not provide a method of installing the secondary containment structure in an already existing tank or other storage means and therefore, the entire tank or storage structure must be replaced with a new secondarily contained structure. As can be appreciated by one of ordinary skill in the art, removing a tank from service so that it may be dismantled and replacing it with a whole new structure causes significant disruption and expense, particularly when dealing with hazardous materials. Thus, several systems have been developed for retrofitting an existing tank or storage unit with a secondary containment structure. Unfortunately, most of these retrofit systems begin with standard pre-cut pieces of steel or other material that are imprecise for the layout of the tank. The tanks usually have several protrusions or obstacles such as sumps, pumps, pipes, nozzles, critical welds, roof supports, or manways that cannot be obstructed by the secondary containment structure. In order to accommodate these obstacles and the dimensions of the tank, the pieces are just cut ad-hoc in places where the pieces are inaccurate after installation. This results in an inefficient and imprecise method of creating the secondary containment system. Therefore, there exists a need for a secondary containment system that can be configured to an existing tank or storage unit whereby the method of installation takes into consideration the unique layout of the tank or storage unit and points of structural stress within the tank prior to and during the installation.

With regards to the testing and monitoring of leaks between the primary and secondary structures, oftentimes the control space or the interstice of the existing systems is one continuous space and therefore, it is difficult to identify where a detected leak is occurring. As a result, the entire tank must be inspected for the leak or complex and expensive electronic monitoring systems must be used for pinpointing the exact location of the leak for repair. Furthermore, a single leak harmfully permeates the entire control space. Accordingly, there exists a need for the secondary containment system to be geometrically divided such that the origin of a leak can be quickly located and pre-contained before any manual intervention.

In addition, testing and repair of the integrity of the secondary containment structure does not ordinarily occur until the entire structure has been installed. The installation crew must clear the tank before a qualified technician can enter the tank with a mass spectrometer to conduct the testing. Where welds are used to install the secondary containment structure to the existing tank surface, testing the welds in this fashion results in at least one day of lost productivity per test without any direct feedback to the welders who have performed the work. If leaks are found, the welders must repair the leaks, clear the tank and have the testing process repeated. This cyclical process could be repeated 3 to 5 times before the installation passes a quality inspection. Since the typical installation is about 12 days, the addition of 3 to 5 days for testing is a significant amount of time, resources and expense. Thus, there exists a need for an accurate and simple test-as-you-go method for testing the integrity of the secondary containment structure that does not require the use of expensive, cumbersome and technical equipment and does not require that the crew complete installation before the testing can begin. As a result, repairs can be made on the spot and the crew can identify the defects in their techniques early on in the installation process thereby minimizing installation costs and improving the predictability of the system's integrity.

SUMMARY OF THE INVENTION

The present invention provides a system and method of designing, installing, testing, and monitoring a secondary containment system for new and existing Above Ground Storage Tanks (ASTs) which does not possess the drawbacks of known systems of this type. Moreover, this invention allows for implementation across a broader range of existing environments.

This system and method consists of the installation of a steel membrane comprised of one or more steel plates within a new or existing AST for the purpose of providing a means of secondary product containment to reduce the risk of a product release into the environment. This system is not intended to replace the structural primary floor or walls of the AST, which are generally constructed in accordance with the American Petroleum Industry Standard API 650.

The present invention provides the elements and methodology to construct a new secondary containment system, which ultimately lays in direct contact with the existing tank structure. One or more plates form the impervious steel membrane, which when attached by seal welds to a tank shell having a tank floor and a tank wall, forms a sealed interstitial space with one or more zones between the membrane and the primary tank structure. Interstitial zoning, wherein each zone may be installed one by one, allows for concurrent testing of completed zones and fabrication of the uncompleted zones during construction and aids in identifying and locating a breach in the secondary containment system for repair.

The steel membrane creates no significant change in the volume of the tank and results in a negligible loss of storage capacity. This system provides secondary containment for the floor of the tank, including the floor-to-wall juncture, and the lower portion of the tank shell. The design of this system encapsulates existing tank features by molding itself around the existing contours, such as repair plates, corners, sumps, etc. There are no voids in the overall secondary protection. Alternatively, this system can be extended up the internal wall of the tank to any height providing complete secondary containment coverage for the entire AST.

Furthermore, a unique testing method using a simple electronic device is provided for on-site testing of the integrity of the weld seams that may be efficiently used after each zone is installed without requiring that the entire tank be evacuated during the construction of other zones.

DETAILED DESCRIPTION OF THE INVENTION

For a better understanding of the present invention, reference may be had to the following detailed description taken in conjunction with the appended claims and the accompanying drawings.

Figure 1:
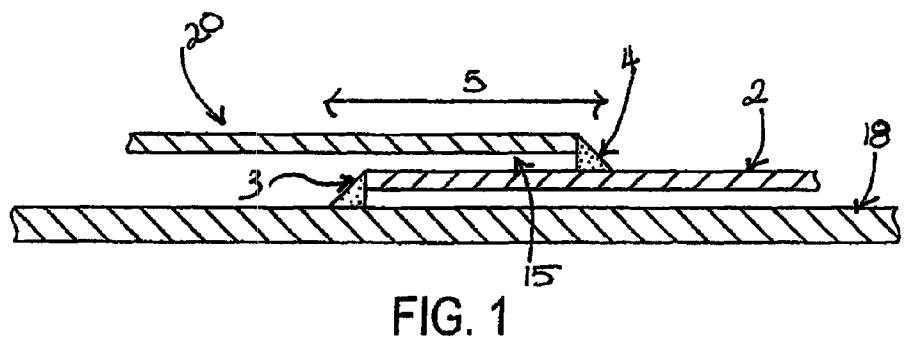
FIG. 1 is a cross-sectional view of the welds used to fabricate the steel membrane of the present invention.

Referring to FIG. 1, a steel membrane 20 is fabricated by joining at 4 an array of steel plates 2 together using double welded butt joints, single welded butt joints with backing strips, single welded lap joints as shown at 5, or any other means in accordance with accepted industry practice. The plates 2 form an impervious steel membrane 20, which when attached to a tank shell 18 having a tank floor and tank wall, forms a sealed interstitial space 15 between the membrane 20 and the primary tank structure 18.

Figure 10A:
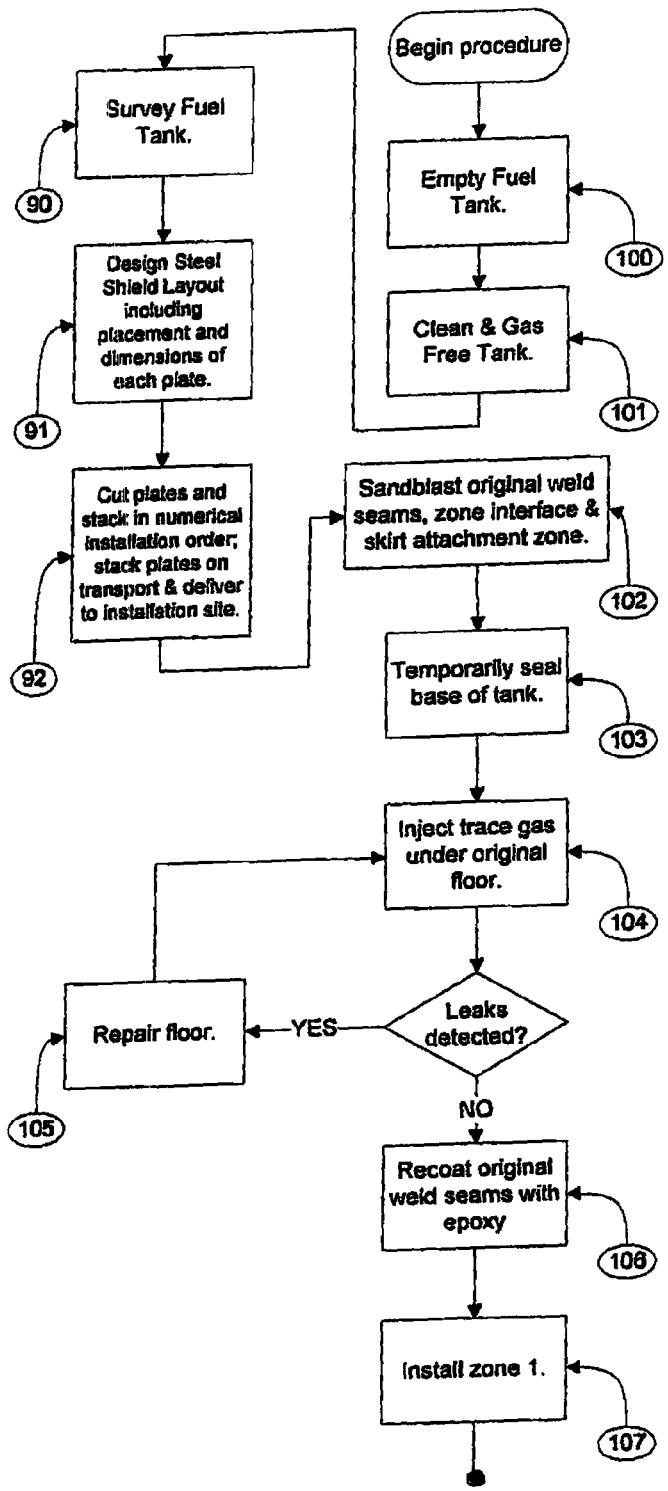
FIG. 10A is a flow chart view of the method of erecting a steel membrane according to the present invention depicting each step prior to installing a first zone of the steel membrane.
Figure 10B:
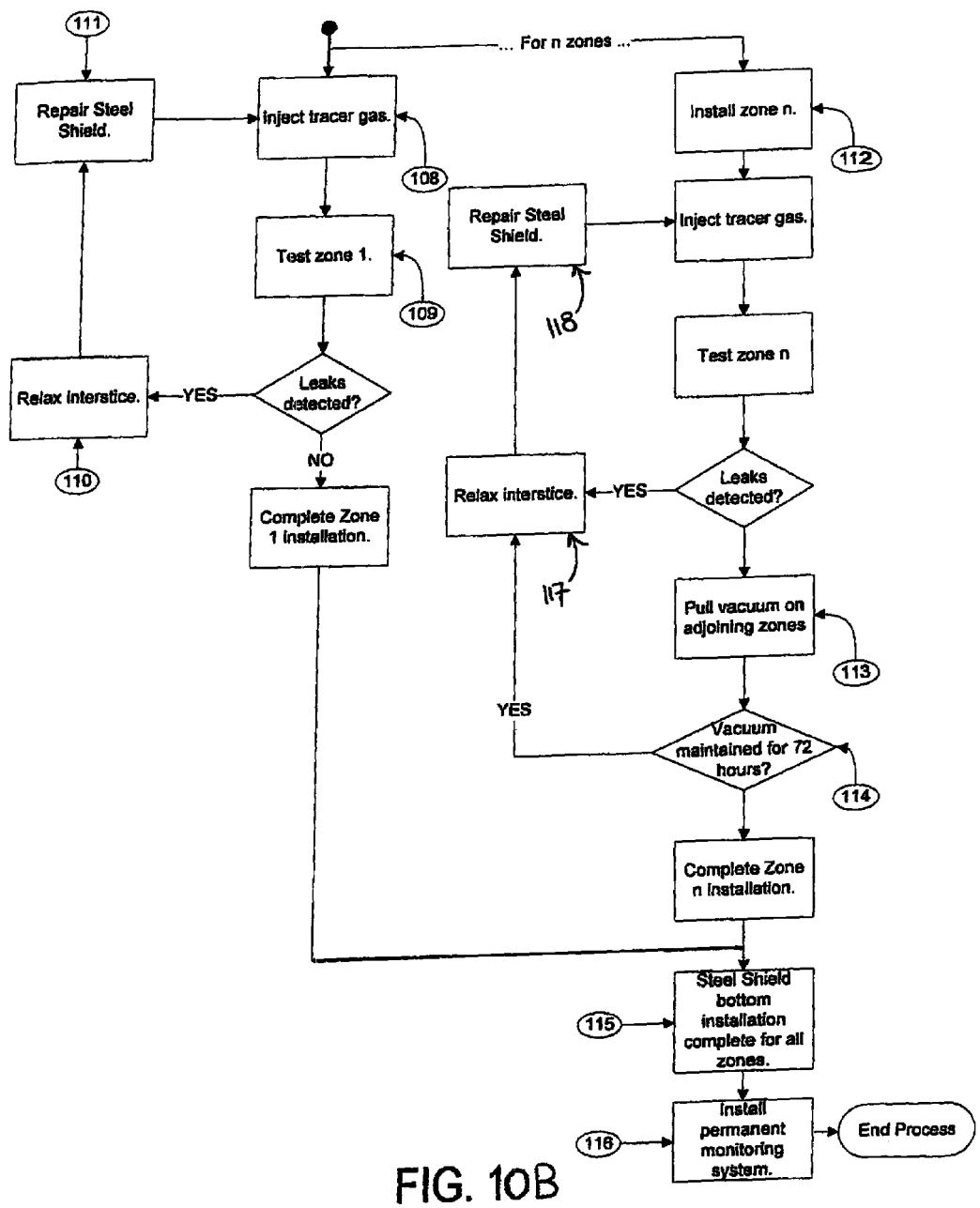
FIG. 10B is a flow chart of the method of erecting a steel membrane according to the present invention depicting each step after installation of the first zone of the steel membrane.

As shown in the flow chart in FIGS. 10A and 10B, which depicts the method of erecting the secondary containment structure, prior to fabricating the steel membrane 20 in an existing tank, any fuel remaining in the tank is removed at step 100 and the tank is cleaned at step 101. The existing weld seams and the areas on the interior surface of the tank to which the steel membrane 20 will be attached are preferably sandblasted at step 102 in order to prepare the interior surface for the attachment of the steel membrane 20. The tank is then surveyed at step 90 and a layout for the steel membrane is created at step 91, including determining the placement and dimensions of the steel plates 2. At step 92, the plates 2 are then cut to specification and stacked in numerical installation order prior to reaching the site of the tank. The base of the tank is then tested for any existing leaks by temporarily sealing the base of the tank at step 103 and injecting a trace gas, such as a mixture of hydrogen and nitrogen, beneath the floor of the existing tank at step 104. If a leak is found by detecting the presence of the trace gas in the interior of the tank as described in detail further below, the leak is repaired at step 105. This testing process is repeated until no leaks are detected. Once it is determined that the existing tank does not contain any leaks, the existing weld seams are coated with an epoxy at step 106.

Figure 2A:
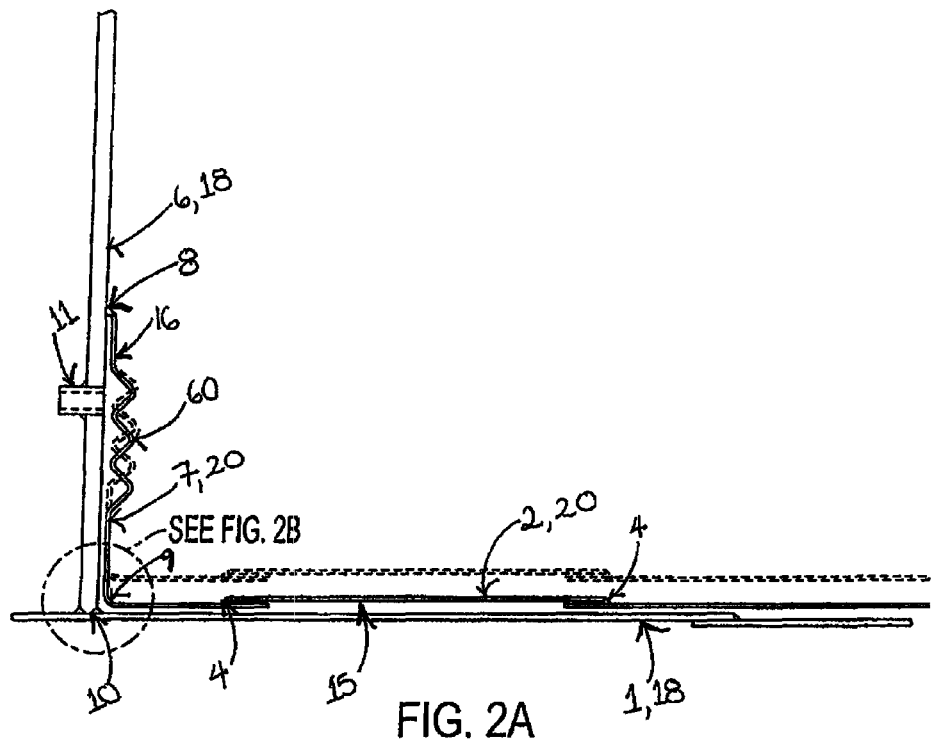
FIG. 2A is a cross-sectional view of an above ground storage tank employing an exemplary embodiment of the steel membrane of the present invention.

Referring to FIG. 2A, a ring of vertical expansion members 16 may be provided for connecting the horizontal floor elements 2 and vertical wall elements 7 of the membrane 20. The minimum height of the structural attachment 8 of the membrane 20 to the tank wall 6 is pre-determined from a comprehensive analytical analysis conducted by using a mathematical algorithm which calculates the combined stresses on this seal weld 8 based upon the tank's dimensions and contents and derives a critical height value therefrom. The maximum height of this membrane 20 is not restricted and may be located at any position on the wall 6 of the tank above the minimum critical height. Using this steel membrane system 20, the entire contents of an AST can be contained without a product release to the environment.

Figure 2B:
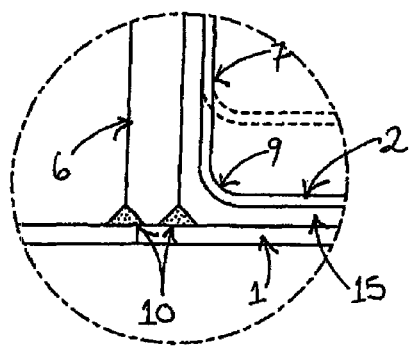
FIG. 2B is a cross-sectional view of the steel membrane with respect to the weld that joins the tank wall of an above ground storage tank to the primary floor or bottom of the tank.
Figure 7:
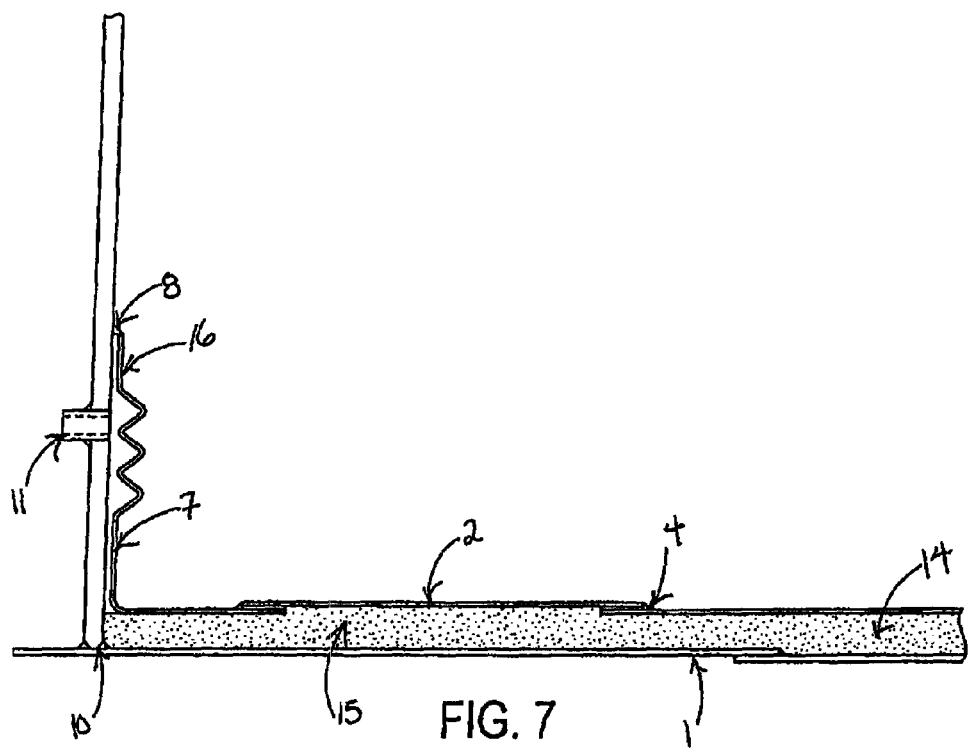
FIG. 7 is a cross-sectional view of an above ground storage tank employing an exemplary embodiment of the steel membrane wherein a refractory material is introduced into the interstitial space.
Figure 8:
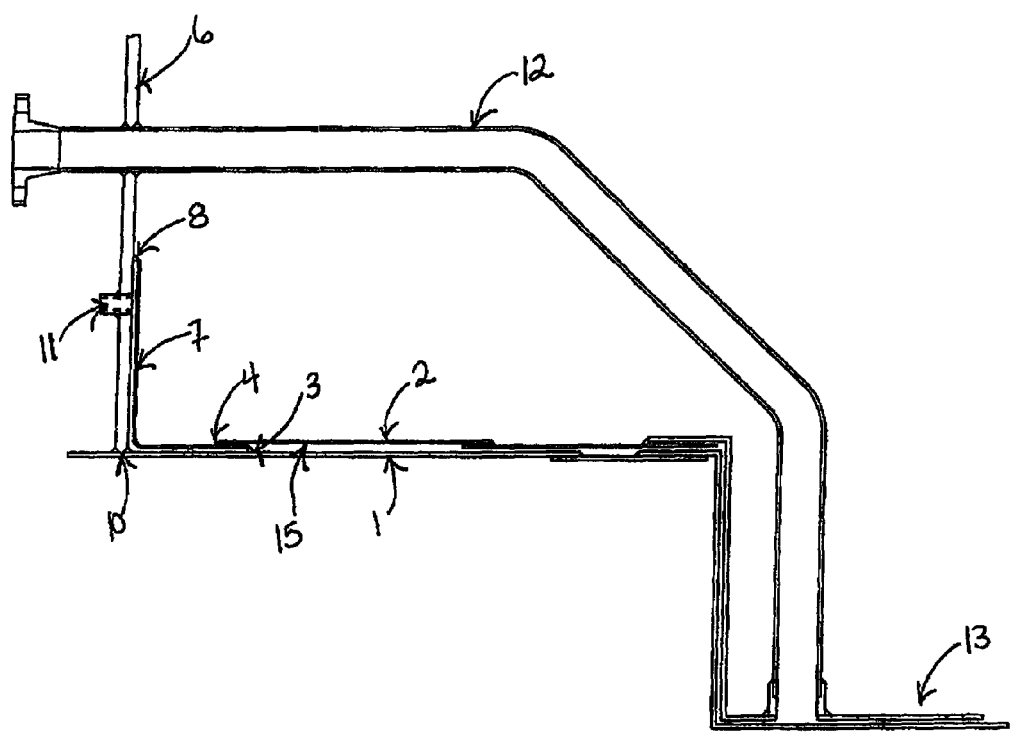
FIG. 8 is a cross-sectional view of an above ground storage tank employing an exemplary embodiment of the steel membrane in a location of the tank having a sump.
Figure 9:
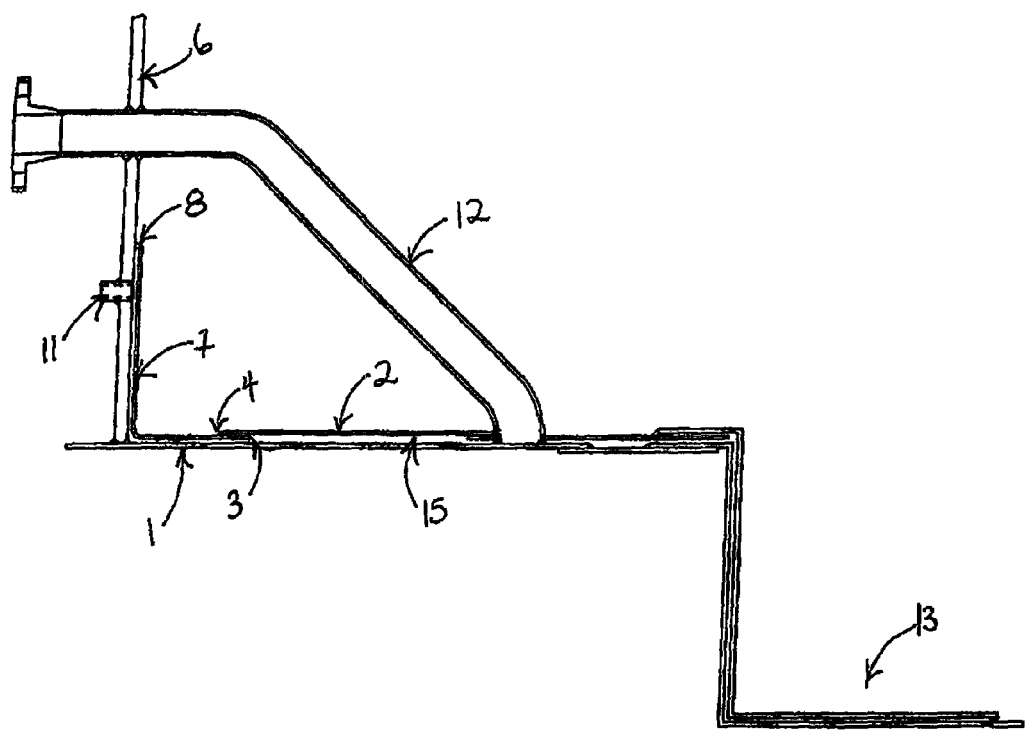
FIG. 9 is a cross-sectional view of an above ground storage tank employing a second embodiment of the steel membrane in a location of the tank having sump.

The vertical expansion members 16 are designed to minimize the stresses on the seal weld 8 that joins the membrane 20 to the tank wall 6. The vertical expansion members 16 also prevent contact with the weld 10 (shown in detail in FIG. 2B) that joins the tank wall to the primary floor or bottom 1 of the tank and allows for the placement of a temporary refractory material 14 (as shown in FIG. 7) between the membrane 20 and the primary floor system 2 during construction over a nonferrous primary tank floor or bottom 1. The vertical expansion members 16 are preferably formed from a single piece of sheet metal. An expansion joint 60 may be fabricated into the vertical leg of member 16 thereby allowing for vertical movement between the membrane 20 and the tank structure 18 while limiting stresses on the seal weld 8. The radius 9 formed between the horizontal 2 and vertical legs 7 of the membrane 20 is designed to prevent the membrane 20 from coming into direct contact with the tank wall-to-bottom weld 10. The vertical expansion member 16 is rolled to the inside diameter of the tank shell 18 for ease of installation.

A structurally sealed interstice 15 is formed between the membrane 20 and the primary tank structure 18. This interstice 15 provides the means for testing the integrity of the secondary containment system, monitoring the secondary containment system for leaks, and facilitating the evacuation and repair of the secondary containment system. The interstice has the ability to be zoned or separated into discreetly sealed volumes. Interstitial zoning allows for concurrent testing of completed zones and fabrication of the uncompleted zones during construction and aids in identifying and locating a breach in the secondary containment system for repair. Preferably, before the tank is put into service, the interstice 15 is purged with an inert gas, such as nitrogen, in order to remove any liquid or oxygen-rich air from the interstice as a means for reducing the potential for corrosion.

Figure 3:
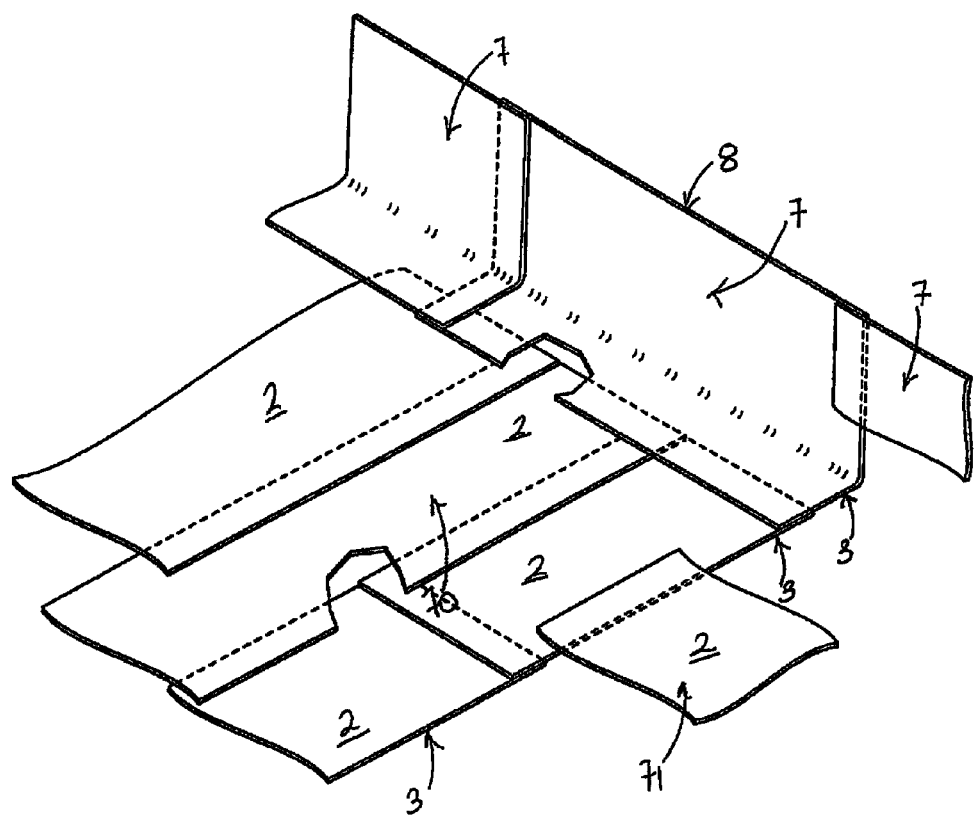
FIG. 3 is a perspective view of a first embodiment of the horizontal floor elements and the vertical wall elements of the steel membrane being employed to create interstitial zones.
Figure 4:
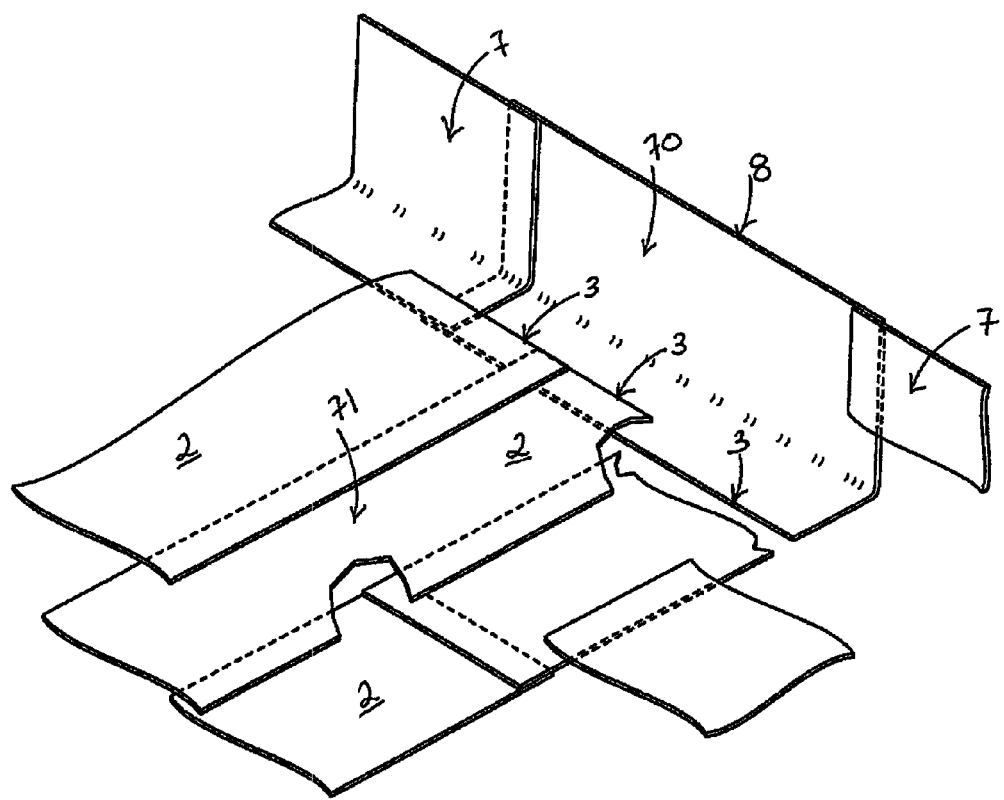
FIG. 4 is a perspective view of a second embodiment of the horizontal floor elements and the vertical wall elements of the steel membrane being employed to create interstitial zones.
Figure 5:
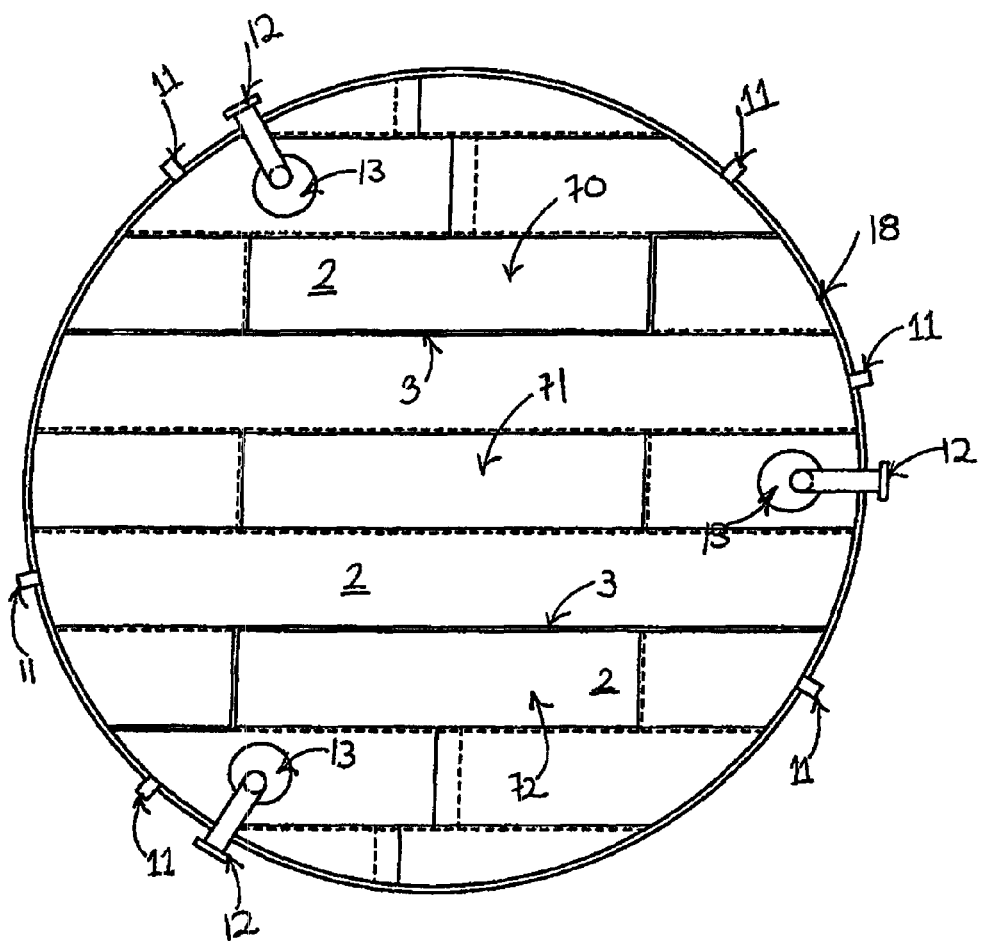
FIG. 5 is a top view of the primary floor or bottom of an above ground storage tank depicting a first embodiment of the horizontal floor elements of the steel membrane being employed to create interstitial zones.
Figure 6:
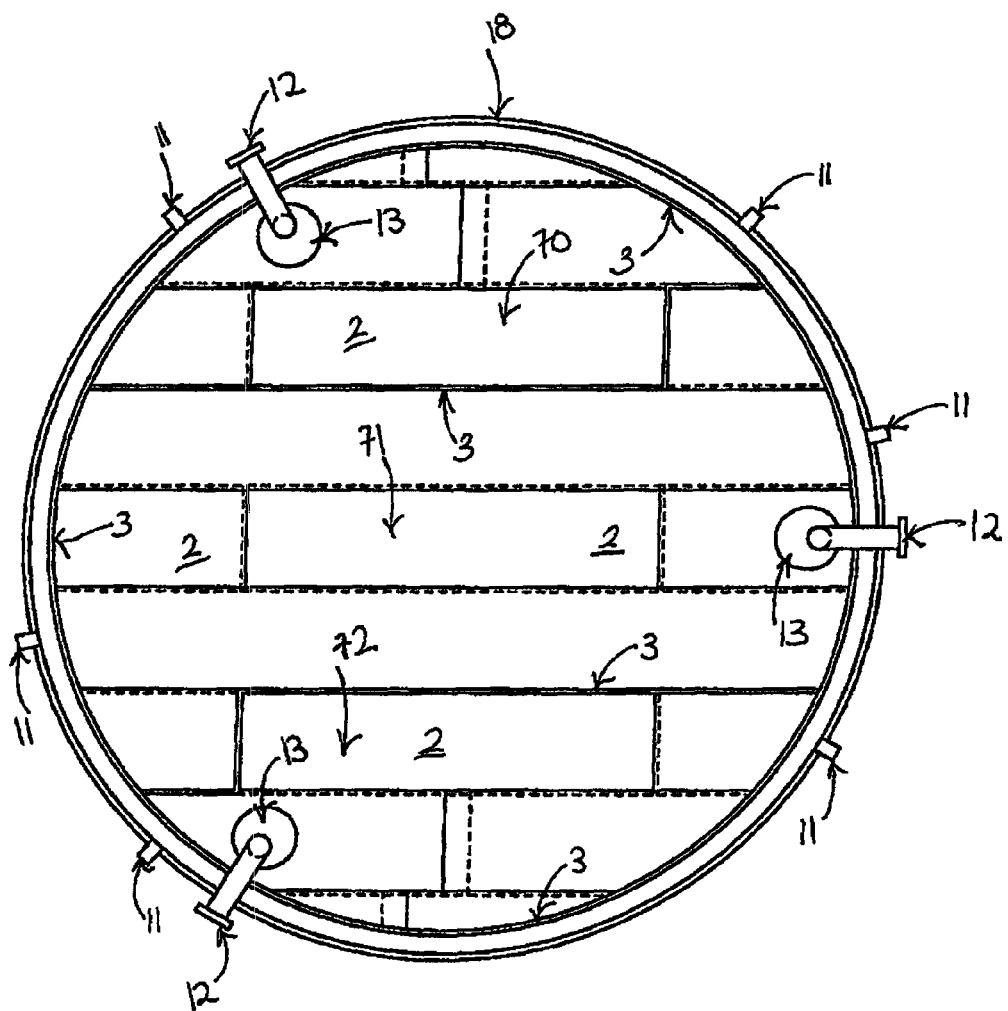
FIG. 6 is a top view of the primary floor or bottom of an above ground storage tank depicting a second embodiment of the horizontal floor elements of the steel membrane being employed to create interstitial zones.

Referring back to FIG. 1, zonal interstices are created by seal welding at 3 the edges of the membrane plates 2 and 7 directly to the primary tank structure 1 and 6 along the perimeter of the desired zone in any suitable design. For example, as shown in FIGS. 5 and 6, the zones (e.g. 70, 71, and 72) may be laid in a staggered or cross-wise fashion. As shown in FIG. 2A, other plates 2 used in the fabrication of the membrane 20 are subsequently welded at 4 to each other, but not to the primary tank structure 1 and 6. This design allows zones to be created without geometric limitation and without the need for additional dividing members. Thus, as shown in FIGS. 3 and 4, zones can be uniquely created to avoid obstacles such as critical welds, roof supports, nozzles, manways, etc. and to include or create desired features such as the number of zones, sumps, proper drainage slopes, etc. As shown in FIGS. 5, 6 and 10, the zones (e.g. 70, 71, and 72) are preferably created one at a time in order to take into consideration the unique layout of any particular tank and to test the integrity of the zones one zone at a time. During the initial design phase prior to reaching the site and beginning the installation process, the tank is surveyed and a design is formed for the layout of the plates. Thereafter, the plates are prefabricated and cut in numerical order and stacked on one or more cranes for delivery to the site. In contrast, most other secondary containment systems used in the industry begin with standard pre-cut pieces that are imprecise for the layout of the tank. In order to accommodate the dimensions of the tank, the pieces are just cut ad-hoc in places where the pieces are inaccurate after installation. This results in a much less efficient and less precise method of creating the secondary containment system than the method of the present invention.

Nozzles or ports 11 and 12 are located and installed on the periphery of the tank wall 6 and provide direct communication with the interstice 15. These ports 11 and 12 are multifunctional and are used in constructing, testing, monitoring, mitigation, and repair of the secondary containment system.

Testing the integrity of the secondary containment system during construction and thereafter is accomplished by, but not limited to, introducing either a pressure or vacuum into the interstice. Acoustical and tracer gas testing technologies can be used to find porosity in the membrane if the interstice is pressurized with a gas. Pulling and maintaining a vacuum in the interstice confirms the integrity of the secondary containment system down to the molecular level of the surrounding environment.

The present invention provides a unique method of testing the integrity of the various seal welds at 3, 4 and 8 during the construction and fabrication of the secondary containment system 20 at a rapid implementation pace using a trace gas and a simple and effective electronic device. This testing method is employed in a test-as-you-go fashion such that the seal welds are tested after each zone is completed. In contrast with the existing state of the art, the testing is performed one zone at a time instead of waiting until the entire installation has been completed such that the installation of a second zone can be performed at the same time as the testing and repair of the first zone.

The existing testing methods ordinarily require that all of the seal welds needed for the installation be completed before any testing of the welds occurs. The welding crew must clear the tank before a qualified technician can enter the tank with a mass spectrometer to conduct the testing. Testing the welds in such a fashion typically results in at least one day of lost productivity per test without any direct feedback to the welders that had done the work. If leaks were found, the welders would repair the leaks, clear the tank and the testing process would be repeated. This cyclical process could be repeated 3 to 5 times before the installation passed a quality inspection. Since the typical installation is about 12 days, the addition of 3 to 5 days for testing is a significant amount of time, resources and expense. By applying the testing method described herein, the testing is done as work progresses thereby eliminating the welding crew's down time. As the testing and work progresses in parallel, the welders obtain immediate feedback which allows them to visualize and implement corrective actions to their techniques much quicker than during the typical process.

The electronic testing device 21 used to test the seal welds is a simple, portable and small sensor device with a simple user interface that can be used by the typical welder and does not require that the user be certified or specially trained in the handling and use of the device. Accordingly, the device provides a faster method of testing that is just as accurate as a much more cumbersome and expensive mass spectrometer. In one preferred embodiment shown in FIG. 11, the device is comprised of a discrete hydrocarbon or other sensor 22 with a probe 50 that is enclosed by a small cylindrical-shaped shroud 23.

Figure 12:
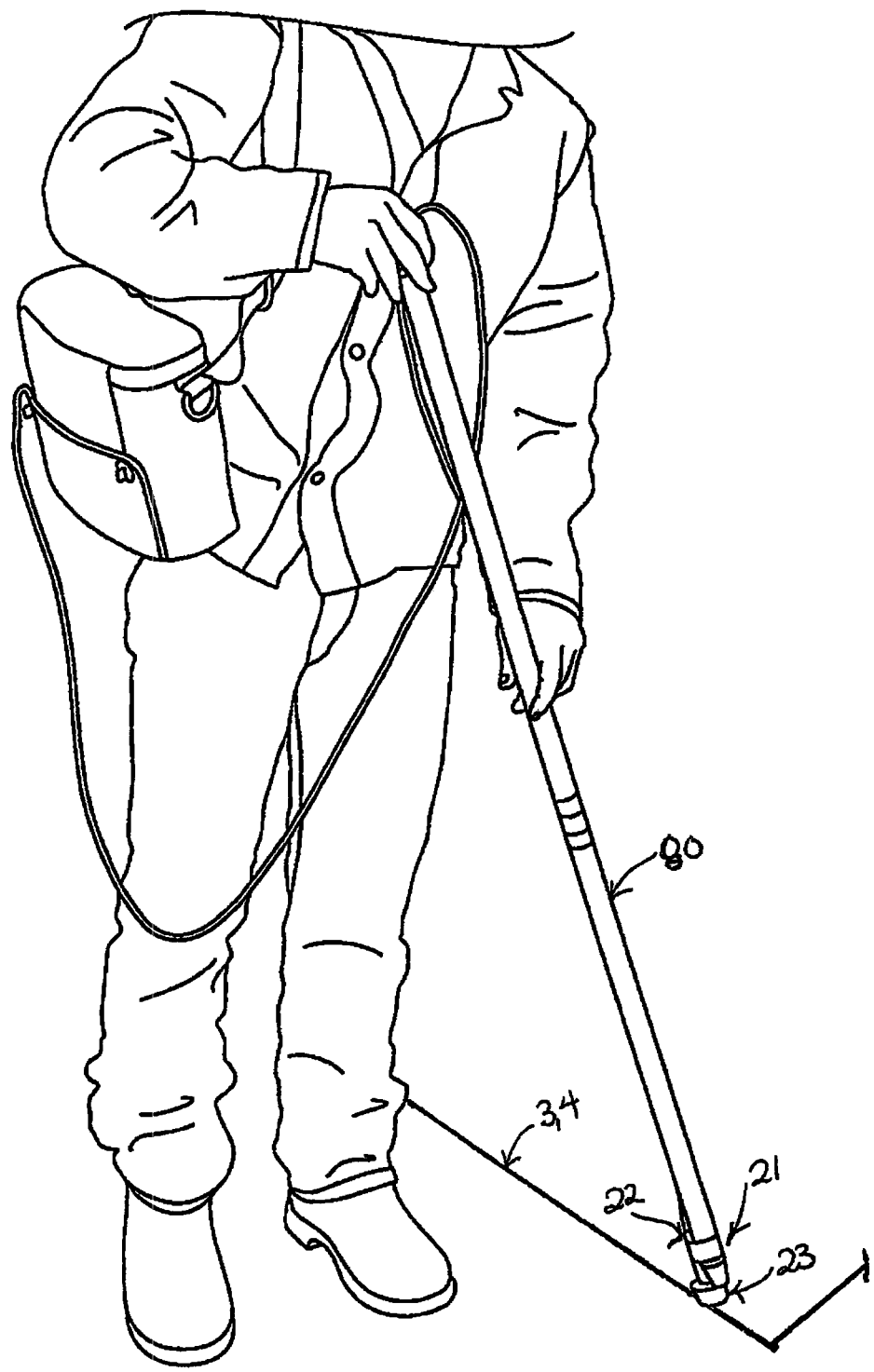
FIG. 12 depicts the electronic testing device of FIG. 11 being employed along a seal weld.

Referring back to FIGS. 10A-B, once a first sealed zone is installed at step 107, the integrity of the seal welds of that particular zone is tested. In order to test the integrity of the seal welds of a particular zone, a trace gas is introduced into the interstice 15 of the sealed zone at step 108 such that the gas permeates through any gaps or leaks in the weld thereby signaling an imperfect weld. Particularly when dealing with highly toxic organic substances such as petroleum, it is extremely critical to be able to detect very small leaks in the welds. Therefore, the trace gas should be a gas having a very small molecular size and weight, such as hydrogen, in order for the gas to permeate through very small leaks. In order to accumulate enough volume of the leaked tracer gas for the sensitivity of the sensor probe 50 to sense it, the shroud 23 of the device 21 should have the suitable dimensions for capturing the requisite volume. In order to use the electronic testing device 21 at step 109, the welder or other user drags the shroud along the seams or welds of the zone whereby the shroud is in contact with the seams such that the encapsulated sensor can sense whether any gas is permeating through the weld as shown in FIG. 12. A pole 80 or other extension device can be attached to the electronic testing device 21 in order to aid the user in dragging the testing device along the floor surface. As described above, because the gas is comprised of very small molecules, the shroud 23 is needed in order to accumulate enough volume or concentration of the leaking gas as it is dragged downward along the seams in order that the sensor can detect the leak. In a most preferred embodiment, the sensor has a $H_2$ sensitivity of 0.2 ppm in air and the trace gas is comprised of 5% $H_2$ concentration. In order to detect a defect in the weld seam of less than 1 micron (μm) in diameter whereby the sensor is dragged along the seam at a steady pace of about 6 inches per second, the shroud must be of suitable dimension to be able to capture between 0.525 and 0.600 cubic inches in volume as the typical leak rate that occurs in the types of weld seams required for this application is on the order of $10^{-7}$ to $10^{-8}$ liters per second. In general, the dimensions of the shroud are dependent upon the sensitivity of the discrete sensor, the composition of the trace gas, the diameter size of the defect and the speed at which the sensor is being dragged across the seam.

If there is a leak present, the sensor outputs an alarm or other signal to the user. Thereafter, the gas pressure in the interstice is relaxed at step 110 and the one or more leaks are repaired at step 111. Thus, this method allows for the welder to receive immediate feedback as to the integrity of his or her welding technique as it applies to the particular tank installation that is being tested. Therefore, this testing method vastly improves the efficiency and quality of the installation by greatly increasing the learning curve of the welding crew. In addition, this testing process can be performed locally at the first zone and therefore, during this testing process, another part of the labor crew can move forward on installing one or more additional zones at step 112. Furthermore, this testing method can be used with any system that is used for this type of containment. For example, the method can be used to test synthetic liners for product leaches through the material itself. It is also contemplated that the testing method can be automated such that the electronic device can be remotely controlled or programmed to robotically run along the seams or welds of the membrane 20.

Figure 11:
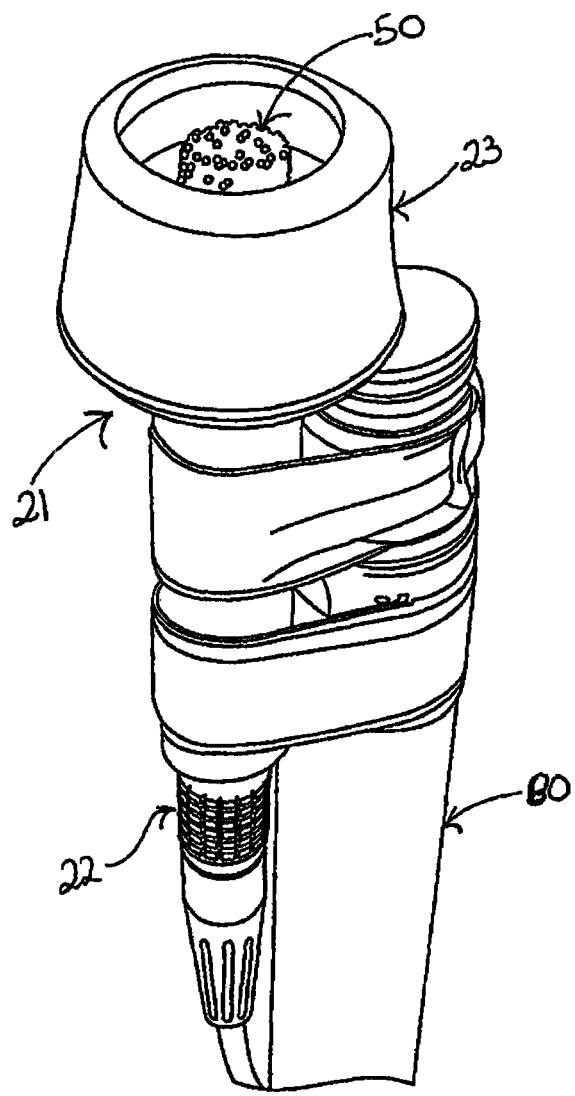
FIG. 11 is a perspective view of an exemplary embodiment of the electronic testing device of the present invention.

A preferred embodiment of the electronic testing device 21 is depicted in FIG. 11. The device is comprised of a discrete hydrocarbon gas sensor 22 with a probe 50 that is encapsulated in a cylindrically-shaped shroud 23. The shroud 23 is preferably manufactured from a natural rubber compound with a Shore A durometer in the range of 80 to 90 in order to provide flexibility and a long wear life. Where the trace gas is comprised of a mixture of approximately 5% hydrogen gas and 95% nitrogen gas, the shroud should be of suitable dimension to capture at least 0.5 cubic inches. The volume of the shroud is derived from the cylindrical shape having a 1.0 inch in diameter and a 1.25 inches in length wherein the probe 50 has a 0.75 inch diameter. The head of the probe is projected through the top of the shroud such that it is ⅝ of an inch deep within the shroud 23. Where the shroud is placed in contact with the weld seams of the floor of the secondary containment structure as described above, the positioning of the probe 50 within the shroud 23 preferably positions the sensor 0.5 inches from the floor. The portion of the shroud in contact with the surface to be tested is angled at 15 degrees to allow the person performing the testing to maintain contact with the surface being tested while moving the testing apparatus. The wall of the shroud 23 is ¹⁄₁₆ of an inch at the base (floor side) and tapers up to a thickness of ³⁄₁₆ at the top. This slight cone shape adds to the rigidity at the top of the shroud and allows for some flexibility at the bottom where the shroud is in contact with the weld to be tested. This flexibility is valuable in maintaining slight contact with the surface being tested.

The above-described testing method was implemented in the field on three separate tank installations and impressive tangible results were easily identified. A new crew was placed on the first tank install and each member of the crew was involved in the testing process. Each welder was shown their defects and was able to compare their welds to welds done by others that did not result in defects. The first tank resulted in 30 defects in 3,850 square feet, which amounts to a defect rate of approximately 7.8 defects per 1,000 square feet. The first tank required 345 man hours 1,000 square feet to complete the installation. By the third tank, after initiating the testing method, the feedback yielded greatly improved quality and productivity in each welder of the crew. The total number of defects dropped to 5 defects in 6,360 square feet, which amounts to a defect rate of approximately 0.79 defects per 1,000 square feet. Furthermore, the third tank required 187 man hours per 1,000 feet to complete the installation. This significant improvement in productivity and reduction in defects translated into a significant savings in costs and labor.

Referring back to FIGS. 10A-B, once the secondary containment system has been completely installed and each of the zones have been successfully tested, a final test is preferably performed by pulling a vacuum in all adjoining zones at step 113. If the vacuum can be maintained for at least 72 hours without a change in pressure at step 114, the installation is complete at step 115 and a permanent monitoring system is installed at step 116 for use during the service of the tank or other containment structure. If the vacuum cannot be maintained for at least 72 hours, the pressure in the interstice is relaxed at step 117 and the membrane 20 is repaired at step 118.

Monitoring the system for leakage during service is accomplished by, but not limited to, introducing either a pressure, liquid, or vacuum into the interstice, or by using a discrete hydrocarbon or liquid sensor. A pressure, vacuum, or liquid loss within the interstice would signal a breach in the integrity of the secondary containment system. The use of liquid hydrocarbon or water sensors within the interstice would confirm that the size of the breach is large enough to allow liquid to pass. As shown in FIGS. 5, 6, 8 and 9, sumps 13 are properly located within each zone and are fitted with a receiver tube 12 that originates at the outside of the tank wall 6 and terminates at a low point in the interstitial space, such as the bottom of the sump 13. This tube provides a direct link to the low point drain within each zone. Any liquid entering the interstice will eventually gravitate to this low point drain where a sensor can be inserted to detect the presence of a liquid and to identify the makeup of the liquid (i.e. gas or water).

As can be appreciated by one of ordinary skill in the art, if a breach occurs within the primary tank system 18, the entire contents of the AST remain within the secondary containment system 20. Alternatively, if a breach occurs in the secondary system 20, the entire contents of the AST remain within the primary tank system 18. It is unlikely that product would be released into the environment if remedial action were taken at that time. Continuous monitoring of the interstice 15 and immediate alarm notification from the monitoring system prevents unnoticed damages from worsening over time thereby saving the tank owner from making unnecessary, derivative repairs. Monitoring the interstice is performed by, but is not limited to, a Programmable Logic Circuit (PLC) based monitoring system. The monitoring system continuously checks the integrity of the secondary containment system, maintains the required liquid, vacuum, or pressure levels within the interstice, outputs warnings and alarms, and maintains a log of all warning and alarm events.

Repairs to the membrane 20 are made using the same techniques used to repair all steel ASTs in accordance with API 653. The shell nozzles and ports 11 and 12 can be used to pump out contaminants and to eliminate any gas from the interstice 15 prior to hot work (i.e. welding). Depending upon the location and severity of the breach in the secondary containment system, it is possible to make repairs to the secondary system without removing the tank from service. This is accomplished by, but limited to, introducing a liquid sealant into the interstice 15. Liquid sealant is pumped into the interstice 15, circulated and removed through the ports 11 and 12 that are located in the tank wall 6. Thereafter, the liquid sealant hardens when exposed to any air and therefore, efficiently plugs any gap or leak in the membrane 20. Any liquid sealant that hardens upon contact with or exposure to air is suitable for this purpose. For example, radiator stop leak products may be used.

The design of the secondary containment membrane 20 allows for implementation across a broad range of existing environments including, but not limited to: 1) installation over a ferrous structure, 2) installation over a non-ferrous coated structure without removing the coating, and 3) installation of two or more membranes to provide secondary protection where the integrity of the existing primary bottom cannot be maintained.

Materials coatings, such as fiberglass, give off a variety of toxins including volatile organic compounds (VOC), semivolatile organic compounds (SVOC) and polynuclear aromatic hydrocarbons (PAH) when heated. Therefore, installing this system over a non-ferrous coated tank structure will generally require that a temporary refractory material be placed between the primary tank structure 18 and the membrane 20 where welding is to occur. As shown in FIG. 7, refractory material 14, such as sand, can be spread over the top of the primary tank bottom 1 to act as an insulator to shield the heat created from the welding process when fabricating the membrane 20. Only those areas where the membrane 20 is to be welded to the primary structure 18 will require localized removal of the coating. The insulating refractory material 14 may be removed from the interstice 15 upon completing the fabrication of the membrane 20. The ring of vertical expansion joints 16 allows the entire membrane 20 to reposition and settle on the primary tank floor 1 without causing excessive stresses to occur on the seal weld 8 that attaches the membrane 20 to the tank wall 6. In this case, the removal of the refractory material 14 from the interstice 15 is accomplished through a purging process consisting of blowing and pulling high-pressure air through the interstice 15 via the nozzles 11 and 12.

Very often the condition of the existing primary tank bottom 1 prohibits repairing the bottom to a condition required to contain product. In this case, two steel membranes 20 can be constructed over the primary structure 18 to provide secondary containment. The new membranes 20 do not replace the API requirements for the AST bottom 1 but do have the ability to contain the entire contents of an AST without a product release to the environment.

The unique characteristics of the present invention provide many features and advantages over existing secondary containment technologies currently in use for AST. The test-as-you-go methodology provides efficient and predictable implementation times. The versatility of the design allows for it to be applied to a variety of tank conditions and geometries. The system offers the ability for continuous integrity checking over the entire secondary containment system, identification of the source and location of the leak, and in-service remediation of any leaks.

In the foregoing description, the present invention has been described with reference to specific exemplary embodiments thereof. It will be apparent to those skilled in the art that a person understanding this invention may conceive of changes or other embodiments or variations, which utilize the principles of this invention without departing from the broader spirit and scope of the invention. For example, the system and methods described above can be applied to any type of storage or containment structure where it is desirable to have a secondarily contained structure. The specification and drawings are, therefore, to be regarded in an illustrative rather than a restrictive sense. Accordingly, it is not intended that the invention be limited except as may be necessary in view of the appended claims.

We claim:

1. A secondary containment system for a fluid containment structure, comprising:
    a primary surface having a horizontal floor portion and a vertical wall portion;
    a secondary surface positioned on top of the primary surface, the secondary surface comprised of a plurality of horizontal plates that are sealingly attached directly to each other such that there exists an interstitial space between the primary and secondary surfaces; and
    a plurality of vertical members that sealingly attach the plurality of horizontal plates of the secondary surface to the vertical wall portion of the primary surface.

2. The secondary containment system of claim 1 wherein the interstitial space is divided into one or more sealed zones by overlapping one or more of the plates.

3. The secondary containment system of claim 1 wherein the plurality of vertical members are rolled at the joint between the horizontal floor portion and a vertical wall portion of the primary surface such that a vertical expansion members and the joint are not in direct contact.

4. The secondary containment system of claim 1 wherein the plurality of plates are comprised of steel.

5. The secondary containment system of claim 4 wherein the plurality of plates are sealingly attached to the primary surface by one or more seal welds.

6. The secondary containment system of claim 1 wherein the plurality of vertical members are sealingly attached to the vertical wall portion of the primary surface at a height greater than a critical height of the primary surface.

7. The secondary containment system of claim 6 wherein the critical height of the primary surface is derived from a mathematical algorithm that is based upon the dimensions and the combined stresses of the primary surface.

8. The secondary containment system of claim 6 wherein the critical height of the primary surface is derived from a mathematical algorithm that is based upon the dimensions and the combined stresses of the primary surface.

9. The secondary containment system of claim 1 further comprising a means for detecting a leak in the interstitial space.

10. The secondary containment system of claim 9 wherein the means for detecting a leak in the interstitial space is comprised of maintaining a continuous and sufficient negative pressure in the interstitial space.

11. The secondary containment system of claim 10 wherein the means for detecting a leak in the interstitial space is comprised of a discrete sensor that is positioned proximate a low point of the primary surface.

12. The secondary containment system of claim 11 wherein the sensor is a hydrocarbon liquid or gas sensor.

13. A secondary containment system for a fluid containment structure, comprising:
    a primary surface having a horizontal floor portion and a vertical wall portion;
    a secondary surface comprised of a plurality of steel plates that are welded directly to the horizontal floor portion of the primary surface such that there exists an interstitial space between the primary and secondary surfaces;

wherein one or more of the plurality of plates overlap thereby dividing the interstitial space into one or more sealed zones;

a means of detecting a leak in the interstitial space;

a plurality of vertical members that sealingly attach the plurality of plates of the secondary surface to the vertical wall portion of the primary surface at a height greater than a critical height of the primary surface.

14. The secondary containment system of claim 13 wherein the critical height of the primary surface is derived from a mathematical algorithm that is based upon the dimensions and the combined stresses of the primary surface.

15. The secondary containment system of claim 13 wherein the plurality of vertical members are rolled at the joint between the horizontal floor portion and a vertical wall portion of the primary surface such that the vertical expansion members and the joint are not in direct contact.

16. The secondary containment system of claim 13 wherein the means for detecting a leak in the interstitial space is comprised of maintaining a continuous and sufficient negative pressure in the interstitial space.

17. The secondary containment system of claim 13 wherein the means for detecting a leak in the interstitial space is comprised of a discrete hydrocarbon liquid or gas sensor that is positioned proximate a sump of the primary surface.

18. A secondary containment system for a fluid containment structure, comprising:

a primary surface having a horizontal floor portion and a vertical wall portion;

a secondary surface positioned on top of the primary surface, the secondary surface comprised of a plurality of horizontal steel plates that are sealingly attached directly to each other such that there exists an interstitial space between the primary and secondary surfaces;

a seal weld between the primary surface and the horizontal plates such that the seal weld defines a discrete zone; and a plurality of steel vertical members that sealingly attach the plurality of horizontal plates of the secondary surface to the vertical wall portion of the primary surface.

19. The secondary containment system of claim 18 wherein the interstitial space is divided into one or more sealed zones by seal welding between the primary and secondary surfaces.

20. The secondary containment system of claim 18 wherein the plurality of vertical members are sealingly attached to the vertical wall portion of the primary surface at a height greater than critical height of the primary surface.

* * * * *